(12) United States Patent
Chaves

(10) Patent No.: US 8,941,468 B2
(45) Date of Patent: Jan. 27, 2015

(54) PLANOGRAM COMPLIANCE USING AUTOMATED ITEM-TRACKING

(75) Inventor: Leonardo Weiss Ferreira Chaves, Karlsruhe (DE)

(73) Assignee: SAP SE, Walldorf (DE)

( * ) Notice: Subject to any disclaimer, the term of this patent is extended or adjusted under 35 U.S.C. 154(b) by 297 days.

(21) Appl. No.: 12/548,480

(22) Filed: Aug. 27, 2009

(65) Prior Publication Data

US 2011/0050396 A1   Mar. 3, 2011

(51) Int. Cl.
*G06K 7/02* (2006.01)
*G06Q 10/08* (2012.01)

(52) U.S. Cl.
CPC .................................... *G06Q 10/087* (2013.01)
USPC ........................................................ 340/10.1

(58) Field of Classification Search
USPC .............. 340/10.1, 10.3, 10.32, 10.33, 10.34, 340/572.1
See application file for complete search history.

(56) References Cited

U.S. PATENT DOCUMENTS

| | | | |
|---|---|---|---|
| 6,752,277 B1 | 6/2004 | Sempliner | |
| 7,932,830 B2* | 4/2011 | Campero et al. | 340/572.7 |
| 7,949,568 B2* | 5/2011 | Fano et al. | 705/22 |
| 2006/0082444 A1* | 4/2006 | Sweeney et al. | 340/10.3 |
| 2007/0023510 A1 | 2/2007 | Smith et al. | |

FOREIGN PATENT DOCUMENTS

| | | |
|---|---|---|
| EP | 1501034 A1 | 1/2005 |
| EP | 1600878 A1 | 11/2005 |

OTHER PUBLICATIONS

Bai et al., "A Model for Fresh Produce Shelf-Space Allocation and Inventory Management with Freshness-Condition-Dependent Demand", Informs Journal on Computing, vol. 20, No. 1, Winter 2008, pp. 78-85.
Bai et al., "Efficiently Filtering RFID Data Streams", CleanDB Workshop, 2006, 8 pages.
Bai et al., "RFID Data Processing with a Data Stream Query Language", IEEE 23rd International Conference on Data Engineering, Apr. 15-20, 2007, 10 pages.
"Documenting the value of merchandising", Executive Summary, Prepared for National Association for Retail Merchandising Services (NARMS) by Willard Bishop Consulting, Ltd., Mar. 2000, pp. 1-12.

(Continued)

*Primary Examiner* — Jennifer Mehmood
*Assistant Examiner* — Yong Hang Jiang
(74) *Attorney, Agent, or Firm* — Brake Hughes Bellermann LLP

(57) ABSTRACT

A planogram specifying items of a item type associated with a first location may be determined, and item read events for the items of the item type may be received from a first receiver associated with the first location and from a second receiver associated with a second location. A first counting of the item read events associated with the first receiver may be determined, and a second counting of the item read events associated with the second receiver may be determined. A clustering algorithm may be applied to the first counting and the second counting to determine a first cluster corresponding to a first subset of the items and a second cluster corresponding to a second subset of the items. Then, for each cluster, it may be determined whether the item read events contained therein indicate a presence of the corresponding subset of the items at the second location and in non-compliance with the planogram.

21 Claims, 7 Drawing Sheets

(56) References Cited

OTHER PUBLICATIONS

Bornhoevd et al., "Integrating Automatic Data Acquisition with Business Processes Experiences with SAP's Auto-ID Infrastructure", Proceedings of the 30th VLDB Conference, 2004, pp. 1182-1188.

Decker et al., "Revealing the Retail Black Box by Interaction Sensing", Proceedings of the 23rd International Conference on Distributed Computing Systems, 2003, 6 pages.

Dempster et al., "Maximum Likelihood from Incomplete Data via the EM Algorithm", Journal of the Royal Statistical Society, Series B (Methodological), vol. 39, No. 1, 1977, pp. 1-38.

Xie et al., "A Sampling-Based Approach to Information Recovery", IEEE 24th International Conference on Data Engineering, Apr. 7-12, 2008, 10 pages.

Floerkemeier et al., "Issues with RFID Usage in Ubiquitous Computing Applications", Pervasive Computing, vol. 3001, 2004, 6 pages.

Franklin et al., "Design Considerations for High Fan-in Systems: The HiFi Approach", Proceedings of the 2nd CIDR Conference, 2005, 15 pages.

Gaukler et al., "Item-Level RFID in the Retail Supply Chain", Production & Operations Management, vol. 16, Issue 1, Jan.-Feb. 2007, pp. 65-76.

Jeffery et al., "An adaptive RFID middleware for supporting metaphysical data independence", The VLDB Journal, vol. 17, No. 2, Mar. 2008, pp. 1-25.

Jeffery et al., "Adaptive cleaning for RFID data streams", Proceedings of the 32nd international conference on VLDB, 2006, 12 pages.

Khoussainova et al., "Towards correcting input data errors probabilistically using integrity constraints", MobiDE'06, Jun. 25, 2006, 8 pages.

Krohn et al., "Collaborative Sensing in a Retail Store Using Synchronous Distributed Jam Signalling", In Proceedings of Pervasive'05, 2005, pp. 1-18.

Rao, Jun et al., "A deferred cleansing method for RFID data analytics", Proceedings of the 32nd international conference on Very large data bases, 2006, pp. 175-186.

Re et al., "Event Queries on Correlated Probabilistic Streams", SIGMOD'08, Vancouver, BC, Canada, Jun. 9-12, 2008, 14 pages.

Tu et al., "Reducing False Reads in RFID-Embedded Supply Chains", Journal of Theoretical and Applied Electronic Commerce Research, Electronic Version, vol. 3, No. 2, Aug. 2008, pp. 60-70.

Tu et al., "Identifying RFID-embedded objects in pervasive healthcare applications", Decision Support Systems, vol. 46, Issue 2, Jan. 2009, pp. 586-593.

Wang et al., "Temporal management of RFID data", Proceedings of the 31st VLDB Conference, Trondheim, Norway, 2005, pp. 1128-1139.

Chaves, F. L. W. et al., "Tagmark: Reliable estimations of RFID tags for business processes", Proceeding of the 14th ACM SIGKDD international conference on Knowledge discovery and data mining, 2008, pp. 999-1007.

Evan et al., "Cascadia: A System for Specifying, Detecting, and Managing RFID Events", Proceeding of the 6th international conference on Mobile systems, applications, and services, Context monitoring, 2008, pp. 1-14.

Extended European Search Report for EP Application No. 10008705.5, mailed Nov. 26, 2010, 6 pages.

Extended European Search Report Response for EP Application No. 10008705.5, filed Jun. 22, 2011, 18 pages.

\* cited by examiner

PLANOGRAM COMPLIANCE USING AUTOMATED ITEM-TRACKING

TECHNICAL FIELD

This description relates to item tracking for planogram compliance.

BACKGROUND

Radio Frequency Identification (RFID) is an example of item tracking technology which provides for the detection of a presence, location, or movement of one or more items. For example, an individual item may be provided with an RFID tag which may automatically be detected by a corresponding RFID reader when the item and associated RFID tag are within a defined proximity of the RFID reader, where the proximity is defined based on a reading range of the RFID reader. RFID and similar item tracking technologies therefore generally provide a way to perform item tracking, potentially without requirement as to a positioning (within the reading range) or orientation of the item being tracked. Such RFID tracking techniques are therefore known to provide convenient item tracking in a wide variety of contexts, including, for example, inventory management within a retail or warehouse environment, tracking of patients and/or medicine/drugs within a hospital or other clinical environment, management of books and other media within a library or museum, and many other known uses.

Planograms generally refer to a plan or other specification of a layout or positioning of items within a predefined location or geographical area. For example, within a retail environment such as a grocery store, a number of aisles may exist within the grocery store, each aisle including a number of shelves. A planogram for a particular aisle may therefore specify placement of items of at least a first product type on a first shelf, and items of at least a second product type on a second shelf. Such planograms are known to be effective tools for increasing sales, managing inventory, and otherwise ensuring that desired items are correctly placed, in order, e.g., to optimize profits or other parameters. In practice, however, planograms may be difficult to enforce, because items may be misplaced by customers, employees, or other users. Further, planograms may be known to change rapidly in certain environments, such as when a grocery store or other retail environment updates planograms in response to seasonal changes.

SUMMARY

According to one general aspect, a system including instructions recorded on a computer-readable medium may comprise a planogram reader configured to determine a planogram specifying items of an item type being associated with a first location, an event handler configured to receive item read events for the items of the item type from a first receiver associated with the first location and from a second receiver associated with a second location, and a cluster analyzer configured to apply a clustering algorithm to a first counting of the item read events associated with the first receiver and a second counting of the item read events associated with the second receiver to thereby determine a first cluster corresponding to a first subset of the items and a second cluster corresponding to a second subset of the items. A result manager may be configured to determine, for each cluster, whether the item read events contained therein indicate a presence of the corresponding subset of the items at the second location and in non-compliance with the planogram.

According to another general aspect, a planogram specifying items of a item type associated with a first location may be determined, and item read events for the items of the item type may be received from a first receiver associated with the first location and from a second receiver associated with a second location. A first counting of the item read events associated with the first receiver may be determined, and a second counting of the item read events associated with the second receiver may be determined. A clustering algorithm may be applied to the first counting and the second counting to determine a first cluster corresponding to a first subset of the items and a second cluster corresponding to a second subset of the items. Then, for each cluster, it may be determined whether the item read events contained therein indicate a presence of the corresponding subset of the items at the second location and in non-compliance with the planogram.

According to another general aspect, a computer program product being tangibly embodied on a computer-readable medium and may include executable code that, when executed, is configured to cause a data processing apparatus to determine a planogram specifying items of a item type associated with a first location, receive item read events for the items of the item type from a first receiver associated with the first location and a second receiver associated with a second location, determine a first counting of the item read events associated with the first receiver, determine a second counting of the item read events associated with the second receiver, apply a clustering algorithm to the first counting and the second counting to determine a first cluster corresponding to a first subset of the items and a second cluster corresponding to a second subset of the items, and determine, for each cluster, whether the item read events contained therein indicate a presence of the corresponding subset of the items at the second location and in non-compliance with the planogram.

The details of one or more implementations are set forth in the accompanying drawings and the description below. Other features will be apparent from the description and drawings, and from the claims.

DETAILED DESCRIPTION

In view of the above, RFID and similar item tracking technologies may have potential to enable or facilitate planogram compliance. E.g., in the above examples, RFID readers may be used to detect a presence of items of the various product types for comparison against an appropriate planogram. For example, a first RFID reader may be placed at a first shelf and configured to have a reading range sufficient to detect items placed on the first shelf. Similarly, a second RFID reader may be placed on the second shelf and configured to have a reading range sufficient to detect items placed on the second shelf. In this way, readings from the RFID readers may easily be associated with the corresponding shelves. Then, any detection of misplaced items may be responded to by the appropriate personnel in order to comply with the appropriate planogram (e.g., moving a misplaced item from an incorrect shelf to a correct shelf).

However, in practice it may occur that the RFID or other similar item tracking technologies may not provide sufficient accuracy to maintain a desired level of planogram compliance. E.g., in the above example(s), it may occur that the RFID reader on the first shelf may fail to detect an item which is actually on the first shelf, and/or may detect an item on the second shelf and therefore erroneously indicate position of that item on the first shelf. Due to these and related difficulties, it may be difficult to enforce planogram compliance to a sufficient or desired degree of accuracy using RFID or other item tracking technologies.

Figure 1:
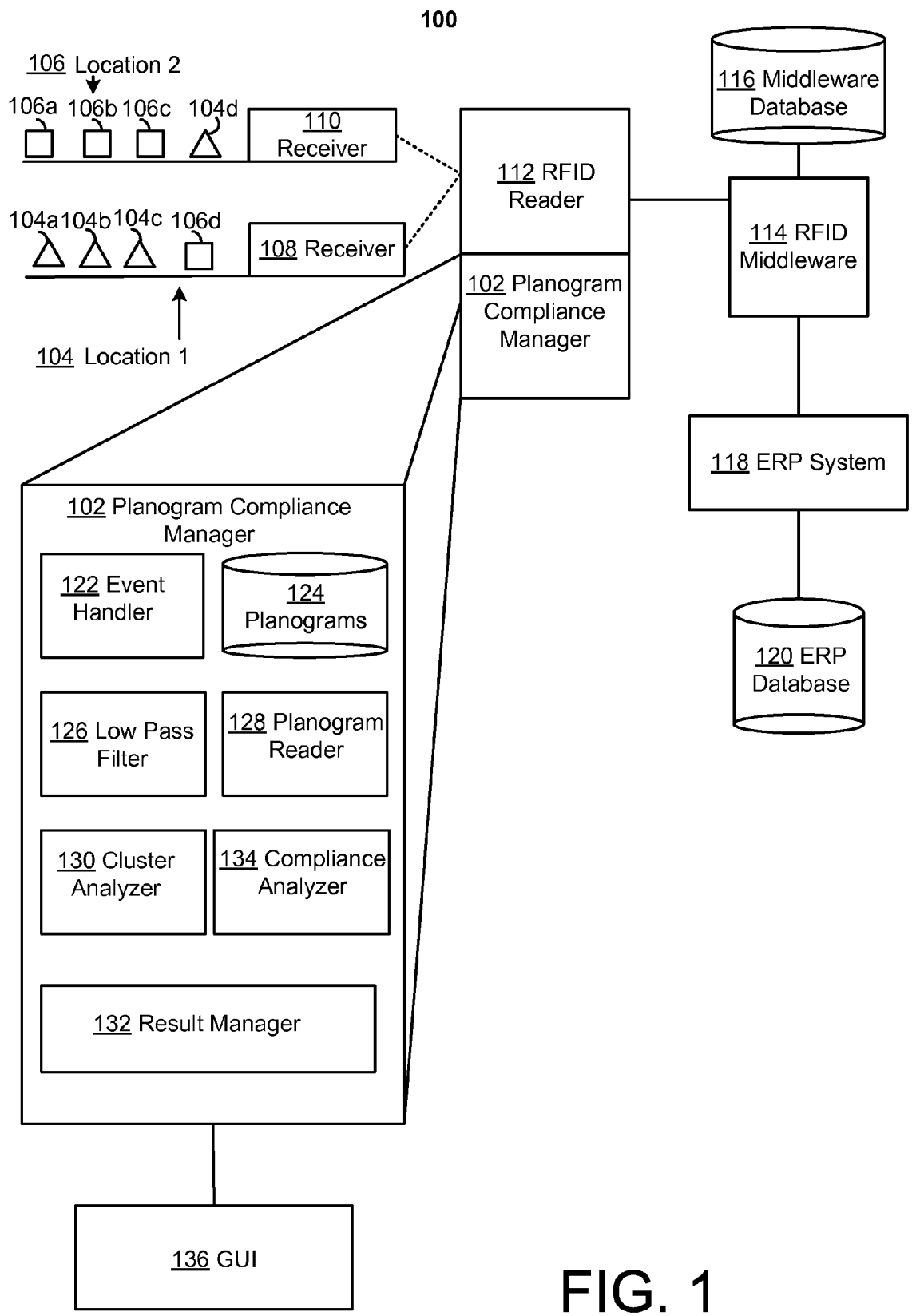
FIG. 1 is a block diagram of a system 100 for maintaining planogram compliance.

FIG. 1 is a block diagram of a system 100 for maintaining planogram compliance. In FIG. 1, a planogram compliance manager 102 is associated with a first location 104 and a second location 106. In the example of FIG. 1, it is assumed that a planogram is in effect which specifies that the first location 104 is associated with a first item type which may include specific items 104A, 104B, 104C, and 104D. Meanwhile, the planogram may further specify that a second location 106 is associated with a second item type which may include specific items 106A, 106B, 106C, and 106D. In the example of FIG. 1, the planogram compliance manager 102 may thus be configured to ensure that an appropriate number of the items 104A-104D are positioned at the first location 104, while ensuring that an appropriate number of the items 106A-106D are positioned at the second location 106, according to the planogram.

As referenced above, in order to enforce such planogram compliance, a first receiver 108 is illustrated as being associated with the first location 104, while a second receiver 110 is illustrated as being associated with the second location 106. In the example of FIG. 1, the first receiver 108 and the second receiver 110 are illustrated as being associated with an RFID reader 112, and may therefore include a first RFID antenna and a second RFID antenna, respectively. Of course, this is just an example, and other item-tracking technologies may be used, as well, including, e.g., technologies based on infrared communications, Bluetooth or other wireless communications, or other item-tracking technologies.

In FIG. 1, it is assumed that the first receiver 108 is configured to have a reading range designed to be large enough to detect items at the first location 104, while not being large enough to detect items at the second location 106. Similarly, the second receiver 110 may be configured to have a reading range sufficient to detect items at the second location 106, while having an insufficient reading range to detect the items at first location 104. More specifically, in the example of FIG. 1, the item tracking technology in use includes RFID technology, in which it is presumed that each of the items 104A-104D and 106A-106D are equipped with an RFID tag, and that the first receiver 108 and the second receiver 110 include at least an RFID antenna and associated circuitry configured to passively or actively read any information stored on such RFID tags. In such cases, a reading range of the first receiver 108 and second receiver 110 may be configured, for example, by appropriately positioning each receiver 108/110 and/or by setting an appropriate power level for each of the receivers 108/110.

Then, the RFID reader 112 may be configured to receive information detected by the first receiver 108 and the second receiver 110 in the form of item read events corresponding to a number of times that each of the receivers 108, 110 detect a presence of one of the items 104A-104D or 106A-106D having a RFID tag, e.g., within a one or more pre-defined period(s) of time. In the system 100 of FIG. 1, the RFID reader 112 may thus be configured to infer or assume that any item detected by the first receiver 108 is in fact located at the first location 104, while any items detected by the second receiver 110 are in fact located at the second location 106.

In reality, however, it may occur that an accuracy, reliability, and operating characteristics of the first receiver 108 and the second receiver 110 (or of the various RFID tags of the items 104A-104D, 106A-106D) are insufficient to ensure this desired result. For example, an actual reading range of the receivers 108, 110 may vary for a number of known reasons, including, for example, ambient conditions in the vicinity of the first location 104 and/or the second location 106, which may enhance or diminish conditions associated with an extent of the reading range(s).

For example, the reading range of the first receiver 108 may, under certain ambient conditions or due to power fluctuations at the first receiver 108, may extend to enable the first receiver 108 to detect items at the second location 106. In this case, the RFID reader 112 will incorrectly infer that all items detected by the first receiver 108 are located at the first location 104, when in fact at least one of the items is located at the second location 106.

Further, it may occur that one or more of the items 104A-104C are incorrectly read by the first receiver 108. That is, even if a reading range of the first receiver 108 operates in a desired and configured manner, it may occur that the first receiver 108 fails to identify or read one or more items 104A-104C which are actually located at the first location. For example, again due to ambient conditions at the first location 104 and/or a material associated with the composition or packaging of the items 104A-104C, there may be destructive interference or blocking in an area which prevents detection of one or more of the items 104A-104C. In this case, the first receiver 108 will underreport a count of the items 104A-104C to the RFID reader 112.

Further, it may occur for a variety of reasons that the items 104A-104D and 106A-106D at the first location 104 and the second location 106 are, at any point in time, actually placed incorrectly with respect to the planogram. For example, a customer may remove item 104D from the first location 104 for inspection, and then incorrectly return the item 104D to the second location 106, e.g., may place the item 104D on a nearby shelf, instead of on a correct shelf. In other examples, employees may incorrectly stock items according to a planogram. In these and other examples, it may occur that the receiver at the corresponding location detects the incorrectly-placed item, whereupon the RFID reader may be configured to compare such reading to a planogram and determine that such an item is incorrectly placed according to the planogram (for example, the second receiver 110 may detect the item 104D and determine that the item 104D is misplaced).

However, it may be appreciated from the above discussion that the practical realities and limitations of capabilities of the first receiver 108 and the second receiver 110 in correctly detecting only those items present at the first location 104 and the second location 106, respectively, implies that an accuracy and reliability of such determination of misplaced items according to the planogram will also be reduced, diminished, or compromised. To give a few examples, it may occur that the first receiver 108 detects the item 106C at the second location 106, in which case, the RFID reader 112 may infer that the item 106C is located at the first location 104, which will be incorrect. In another example, the first receiver 108 may detect the item 104D which is incorrectly placed at the second location 106, so that the RFID reader 112 may incorrectly infer that the item 104D is in fact correctly placed according to the planogram. Further, as already mentioned, the first receiver 108 may fail to detect any of the items 104A-104C or 106D which are actually placed at the first location 104, in which case the RFID reader 112 will have insufficient information to correctly determine a current level or state of planogram compliance.

Thus, in FIG. 1, the planogram compliance manager 102 is configured to receive all item read events determined by the first receiver 108 and the second receiver 110, and configured to determine a corresponding planogram associated with the first location 104 and the second location 106, and thereafter to apply a clustering algorithm to the item read events in order to determine which items, if any, are misplaced, and further to determine correctly-placed items, so as to quickly and accurately determine a level of planogram compliance over time. In this way, the various advantages of planogram compliance (as referenced herein and as otherwise known within the art) may be obtained, including, e.g., improved inventory management, higher efficiency, greater safety, reduced theft, and greater profitability.

It will be appreciated that in the example of FIG. 1, a configuration is illustrated in which the first receiver 108 and the second receiver 110 are illustrated with the first location 104 and the second location 106, as described, and report to a common RFID reader 112. Such a configuration is merely an example, and it may be understood by one of ordinary skill in the art that many other configurations would be equivalent. For example, multiple RFID readers may be positioned at corresponding locations. Further, such RFID readers and/or associated receivers may be mobile (e.g., hand-held or otherwise re-located) and may be associated with each of first location 104 and the second location 106, but only temporarily, e.g., while readings are being taken.

Further in the example of FIG. 1, the RFID reader 112 is illustrated as being in communication with an RFID middleware 114 and associated middleware database 116. For example, although the example of FIG. 1 illustrates only a single RFID reader and associated locations 104, 106, it may be appreciated that a large number of such readers and receivers may be in operation within a given location, so that the RFID middleware 114 and associated database 116 may serve to aggregate and otherwise collect information from such a plurality of readers and receivers.

For example, in a grocery store environment, one or more RFID readers and associated readers may be located at each shelf of each aisle in a plurality of aisles within a grocery store. Then, the RFID middleware 114 may be positioned at a central or other location of the grocery store and configured to aggregate information from all the readers of all of the aisles at the grocery store. In another example, RFID readers and/or receivers may be distributed within patient rooms at the hospital, so that components of the RFID middleware 114 may be positioned at one or more locations within each floor of the hospital.

Further, in the example of FIG. 1, an enterprise resource planning system (ERP) 118 is illustrated along with an associated ERP database 120. Features and characteristics of such an ERP system are well known, including, for example, determining whether resources of enterprise are being deployed in an optimal and efficient manner. For example, in the present examples, the ERP system 118 may track levels of planogram compliance at a variety of locations of an enterprise, and may deploy resources accordingly. For example, it may be determined that planogram compliance at a first retail location/store is low relative to other retail locations/stores of the enterprise, in which case additional employees may be deployed at the first retail location/store in an attempt to raise levels to planogram compliance, or additional training may be instituted at that location for the same purpose. Of course, the ERP system 118 is merely an example, and other back-end applications may be used as desired and/or depending on a setting of the system 100, including, e.g., customer relationship management (CRM) applications, inventory management applications, hospital or library management applications, or any other desired/associated application.

As referenced above, FIG. 1 illustrates an example in which the planogram compliance manager 102 is associated with, and/or part of, the RFID reader 112. It may be appreciated, however, that some or all of the planogram compliance manager 102 may be associated with, or part of, one or more other elements of FIG. 1, or other non-illustrated elements. For example, some or all of the planogram compliance manager 120 may execute at one or more of the RFID middleware 114 or associated database 116, or at the ERP system 118 or associated database 120.

In the specific example of FIG. 1, however, the planogram compliance manager 102 is illustrated as being associated with, or part of, the RFID reader 112. As such, the planogram compliance manager 102 may include an event handler 122 which is configured to receive item read events from, or associated with, the first receiver 108 and the second receiver 110. For example, the RFID reader 112 may be configured (e.g., by the RFID middleware 114 and/or the ERP System 118) to execute a number of readings over a predetermined time period. For example, the RFID reader 112 may be configured to use the receivers 108, 110 to obtain readings for 10 minutes at a time, each hour of a business day. In other examples, the readings may be taken in response to some event, such as a signal from an operator of the system 100 or, in response to some other detected event. Various types of such reading methods and associated features/advantages thereof are well-known in art.

The planogram compliance manager 102 is also illustrated as containing or having access to relevant planograms 124, including the planogram defining appropriate positioning of items at the first location 104 and the second location 106. For example, such a planogram may define a plurality of item types, as well as a number of items of each such item type to be included at each location. In general, the term item may refer to any item which may be outfitted or associated with a corresponding RFID tag, or that may otherwise be detected by whatever item-tracking technology is being deployed. To name a few examples, such items may include items for sale, items being constructed in a manufacturing facility, medicines in a hospital, books in a library, or even human beings (e.g., prisoners in a jail or patients in a hospital). Consequently, items of a particular item type may generally have similar physical characteristics and may thus have similar patterns of detection with respect to a given type of item-tracking technology.

In a more detailed/specific example(s), in a grocery or other retail environment, such an item type may correspond to a product or product type, so that items correspond to items for sale of the given item type. In the simplified example of FIG. 1, it may be assumed that the planogram specifies a first item type at the first location 104 so that items 104A-104D represent items of this item type. Similarly, the planogram may specify an item type associated with the second location 106, so that items 106A-106D represent items of such a second item type. To give specific examples, in a grocery store environment, the item type of the first location may be specified as Coke, while the item type of the second location may be specified as Diet Coke. In a hospital environment, the item type of the first location 104 may be a first type of medicine, while the item type of the second location 106 may represent a second type of medicine, so that in this example the items in 104A-104D and 106A-106C represent individual containers of the corresponding types of medicine. In yet another example, in a library environment, the first location (e.g., shelf) may be associated with an item type of a first classification of library books, while the second location may be associated with a classification of a second type of books (such as, for example, science fiction versus historical fiction).

While FIG. 1 illustrates a simplified example in which only a single item type is specified for each location, it may be appreciated that in fact multiple item types may be specified for each of the locations, and that the relation and positioning of such item types relative to one another at a given location also may be specified by the planogram (for example, three different item types may be specified as being located at a left, middle, and right position on a shelf, respectively). Further, the planogram may specify a minimum number of items for each item type that should exist at each location, so that detection of a number of items below this minimum may be used to trigger a restocking order. Similarly, the planogram may specify a maximum number of items of each item type at each location, so that if such a maximum number is exceeded (e.g., by or due to replacement of items by customers after a complete stocking has occurred at the location, or due to overstocking by an employee) then, again, action may be taken to return to planogram compliance.

As referenced above, it may occur that a relatively large variation in readings of items by the receivers 108, 110 may occur, e.g., during one or more predefined time period(s) during which readings are taken. Such variations in readings may or may not reflect a reality of items at the first location 104 and the second location 106. For example, as referenced above, a reading range of the receivers 108-110 may vary (e.g., may increase or decrease,) over the course of the day or other unit of time during which readings take place. In other examples, the various items may be positioned slightly differently within their respective locations, and thus may or may not be detected at different times, based on such variation in positioning (e.g., may be placed behind a support bar and thus shielded from detection).

In other examples that may occur, that the variation and reading corresponds to actual movement of an item. For example, the item 104A may be detected accurately over the first part of the day, and may be purchased by a customer and thereafter not be detected for the rest of the day. Thus it may be difficult to determine whether a lack of detection of the item 104A is due to the above referenced limitations of the receivers 108, 110 or due to actual absence of the item 104A due to purchase or other movement thereof.

Meanwhile, the item 104D may be detected accurately over the first part of the day, and may be inspected by a customer and incorrectly returned to the second location 106 and thereafter detected by one or both of the receivers 108, 110. Moreover, the item 104D in this example will be less likely to be purchased or otherwise selected in the future (because it is in an unexpected/undesired location), so that the second receiver 110 may collect a large number of item read events for the item 104D as that item rests in a single position over time (i.e., during a large number of readings by the second receiver 110).

Consequently, a particular item being read may experience a large amount of variation in numbers of readings over the course of a reading time period. Specific examples of such variations and readings are illustrated and discussed below with respect to FIG. 3A and FIG. 3B. In general, however, it may be appreciated that a low pass filter 126 of the planogram compliance manager 102 may be used to reduce such variations in readings. That is, low pass filters are well known to permit passage of frequencies below a certain cut-off point or according to a certain filter characteristic, and to attenuate, diminish, or remove frequencies above such defined limits. In the present example, for example, if a particular item is read hundreds of times over the course of the day, then a low pass filter 126 may be applied to such item read events to effectively reduce the number of such events, as explained in more detail, below.

Thus, it may occur over time that item read events from the first receiver 108 and the second receiver 110, and perhaps many other receivers, are received at the RFID reader 112 and reported to the planogram compliance manager 102. Then, a planogram reader 128 may determine an appropriate planogram from the planograms 124 corresponding to a particular set or sets of item read events from the event handler 122, perhaps as filtered by the low pass filter 126. That is, as specified above, the planogram reader 128 may be configured to determine a particular planogram which specifies items and characteristics that are of a particular item type associated with a particular location (e.g., the first location 104, or the second location 106).

Then, a cluster analyzer 130 may be configured to use a first counting of such item read events associated with a particular receiver and therefore (nominally or ostensibly) with a particular location, as well as a second counting of the item read events which are (nominally or ostensibly) associated with a different receiver and thus a different (i.e., the second) location. For example, in the example of FIG. 1, the cluster analyzer 130 may receive all of the filtered item read events and determine which of these filtered item read events are associated with the first receiver 108 and thus (correctly or incorrectly) with the first location 104. Similarly, the cluster analyzer 130 may be configured to look at the filtered item read events and determine and count such item read events which are associated with the second receiver 110 and thus (correctly or incorrectly) with the second location 106.

In other words, the cluster analyzer 130 receives a set of item read events received from both of the first receiver 108 and the second receiver 110, and the cluster analyzer 130 also has knowledge from the planogram reader 128 of which item type is intended by the planogram to be associated with a particular receiver and thus with a particular location. Consequently, the cluster analyzer 130 is able to determine, for each item read event and each associated item, whether the item of the item type was read by a particular receiver (or by both receivers 108, 110).

For example, if the cluster analyzer 130 detects an item read event from the first receiver associated with the item 104C and/or the item 104D, then by virtue of the planogram reader 128 the cluster analyzer 130 may determine that both of the items 104C, 104D were read by the right, correct, or intended receiver. In practice, as referenced above, such a determination may or may not indicate planogram compliance, since, as shown, the item 104C is correctly placed while the item 104D is incorrectly placed with respect to the planogram. Similar comments apply to the items 106C, 106D, as these items may both be detected by the second receiver 110, even though of these only the item 106C is correctly placed according to the planogram. Still further, it may occur that the first receiver 108 incorrectly detects the item 106C and generates an item read event accordingly, while the second receiver 110 may incorrectly detect the item 104C. In such cases, again, it may appear that the items 104C/106C are incorrectly placed, when in fact the items 104C/106C are placed correctly and were merely detected incorrectly by the first receiver 108/second receiver 110.

In order to resolve these and other difficulties and ensure compliance with the planogram, the cluster analyzer 130 may be configured to perform a first counting of the item read events in which a subset of the item read events associated with the first receiver are counted, and similarly may execute a second counting of the overall set of item read events to determine a subset of the item read events associated with the second receiver 110. Then, the cluster analyzer may classify each of the item read events as having been detected by (at least nominally) the correct receiver or the incorrect receiver, and may relate these countings to one another and execute a clustering algorithm to define two clusters of the overall set of item read events. Then, a result manager 132 may be configured to compare output of the cluster analyzer 130 with the planogram reader 128 to determine whether one or both of the clusters represent either correctly placed or misplaced items according to the planogram.

For example, as described in detail below and illustrated with respect to FIGS. 3A, 3B and 4A, 4B, the cluster analyzer 130 may be configured to count a number of times that each item is read by an expected or predicted receiver and graph this counting against a number of times that the same item was read by an unexpected or unpredicted reader. Then the clustering algorithm may be applied to such a graph to define the clusters as referenced above. By way of terminology, it may be appreciated that any reference to a "right," "correct," "expected," "predicted," or similar terms refers to a correlation between an item of an item type and detection thereof by a particular receiver that is associated with that item type (and its location) according to the planogram, even though a particular detected item may actually be placed incorrectly with respect to the planogram.

In FIG. 1, a compliance analyzer 134 is configured to track both the results of the cluster analyzer 130 and the result manager 132 over time, so as to analyze levels of planogram compliance over time. For example, the compliance analyzer 134 may detect/provide information about a level of responsiveness of store employees in restocking shelves or otherwise bringing the locations 104, 106 into compliance with the planogram. In this way, as referenced above, for example, the ERP System 118 or other backend applications may be provided with the ability to detect both a level of effort and resources needed to maintain planogram compliance (e.g., a frequency with which a particular location is associated with planogram non-compliance), as well as effectiveness (or lack thereof) of the enterprise location in addressing such planogram non-compliance in an optimal manner.

To give a specific example, the compliance analyzer 134 may log an occurrence of planogram non-compliance with respect to each aisle or other portion of a retail location. Periodically, the compliance analyzer 134 may compare a current level of compliance for each aisle relative to one or more past levels of compliance. The compliance analyzer 134 may thus detect a particular level of compliance/non-compliance, and/or may detect trends or patterns of compliance improvement or compliance worsening over time.

Finally in the example of FIG. 1, a Graphical User Interface (GUI) 136 is illustrated which may allow user to interact with the planogram compliance manager 102 and such other components of the system 100. For example, it may occur that the GUI 136 is provided at a location of an employee and may provide a visual indication, output or alert of planogram non-compliance when so notified by the result manager 132. For example, in the retail (e.g., grocery) examples above, such a GUI 136 may provide a visual map illustrating the aisles of a grocery store along with a visual indicator of a location of the detected planogram non-compliance. The GUI 136 also may be used to output results of the Compliance Analyzer 134, to view the planogram itself, or to otherwise facilitate a use of the system 100, as described herein and/or as would be apparent.

In the example of FIG. 1, the planogram compliance manager 102 is associated with the RFID reader 112, and the GUI 136 is associated with the planogram compliance manager 102. In practice, however, as referenced above, the planogram compliance manager 102 may be wholly or partially associated with or located at any of the components 112-120. Similarly, the GUI 136 may be associated with any of the components 112-120. For example, the GUI 136 may in fact represent multiple GUI's or screens thereof, some or all of which may be associated with one or more of the components 112-120. The GUI 136 also may represent an otherwise-standard GUI associated with one or more of the components 112-120 which has been modified in order to implement the functionality of the planogram compliance manager 102, or may represent a wholly separate GUI associated exclusively with the planogram compliance manager 102.

In the example of FIG. 1, it may be appreciated that the various components 102, 112-120 may be associated with relevant computer hardware and/or software, as would be appreciated by one of skill in the art, as described in more detail herein below. For example, the RFID reader 112, the RFID middleware 114, and/or the ERP System 118 may be executed using one or more computing devices and thus may represent well known hardware of such computing devices, including, for example, associated processors, memory, displays, power sources and other known hardware elements. If multiple computing devices are used, then it may be appreciated that such computing devices may be remote from one another, and may be connected using a private or public network (such as, e.g., an enterprise-wise intranet or the public internet).

Figure 2:
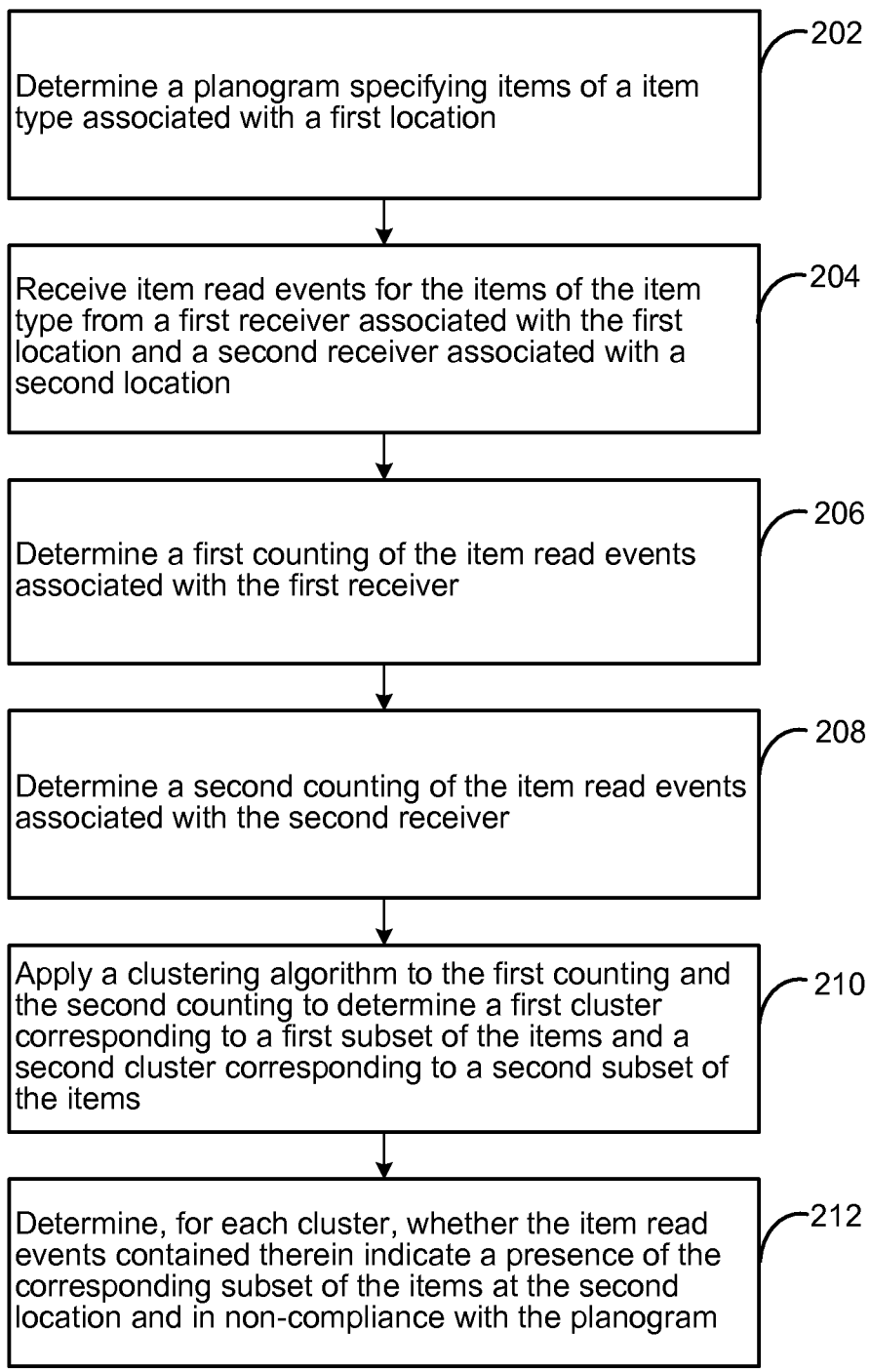
FIG. 2 is a flowchart illustrating example operations of the system of FIG. 1.

FIG. 2 is a flowchart 200 illustrating operations of the System 100 of FIG. 1. In the example of FIG. 2, operations 202-212 are illustrated. The operations 202-212 are illustrated in the example of FIG. 2 in a sequence, but may be understood to operate wholly or partially in an overlapping or parallel manner, or in a different order than that illustrated in FIG. 2, unless otherwise specified.

In the example of FIG. 2, a planogram may be determined which specifies items of an item type associated with a first location (202). For example, the planogram reader 128 may determine a planogram specifying items 104A-104D of a particular item type associated with the first location 104, and may specify items 106A-106D of a particular item type specified with the second location 106.

Item read events may be received for the items of the item type from a first receiver associated with a first location and the second receiver associated with a second location (204). For example, the event handler 122 may receive item read events via the RFID reader 112 from the first receiver 108 associated with the first location 104, and from the second receiver 110 associated with the second location 106.

A first counting of the item read events associated with the first receiver may be determined (206). For example, the cluster analyzer 130 may perform a first counting of a subset of the item read event in which the counted item read events are associated with the first receiver 108. As referenced above, such counting of item read events from the first receiver 108 may correctly or incorrectly identify all of the items actually positioned at the first location 104 at the time of the reading. In general, though, these item read events associated with the first receiver, when executed with respect to items of a single selected item type associated with the first location, represent item read events from the expected/predicted receiver.

A second counting of the item read events may be determined that is associated with the second receiver (208). For example, the cluster analyzer 130 may determine a second counting of a separate subset of the item read events which are associated with (e.g., received by) the second receiver 110. Again, such item read events may or may not actually indicate the presence of the corresponding items at the second location, and may or may not represent a full or complete representation of such items at the second location. In general, though, these item read events associated with the second receiver, when executed with respect to the items of a single selected item type associated with the first location, represent item read events from the unexpected/unpredicted receiver.

A clustering algorithm may be applied to the first counting and to the second counting to determine a first cluster corresponding to a first subset of the items and a second cluster corresponding to a second subset of the items (210). For example, the cluster analyzer 130 may graph item read events for a particular item (e.g., the item 104C or 104D) in which the item read events are associated with the wrong, unintended, unpredicted or unanticipated receiver (here, the second receiver 110), as compared to item read events for the same item (i.e., the item 104C or the item 104D) in which the item was read by the correct, anticipated, predicted, or otherwise specified reader (here, the first receiver 108). In other words, the item 104C may be read by the first receiver 108 and thus may be counted as a correct or predicted item read event. However, the item 104D may be read by the second receiver 110 and thus may be classified as an incorrect or unanticipated item read event. As referenced above, such individual item read events may or may not correspond to actual compliance or non-compliance of the specified item relative to the planogram.

However, as explained in detail herein, the application of the clustering algorithm provides the ability to determine, from such otherwise ambiguous item read events, whether a given item is actually misplaced or not. That is, the specified clusters may be used to provide an indication of whether the intended or expected readings from the corresponding receivers 108, 110 in fact reflect reality, and thus whether a particular item is correctly or incorrectly placed according to the planogram.

For each cluster, it may be determined whether the item read events contain therein indicate a presence of the corresponding subset of the items at the second location and thus in non-compliance with the planogram (212). For example, the result manager 132 may examine the first cluster and the second cluster determined by the clustering algorithm to determine whether one or both of the clusters correspond to correctly placed or misplaced items, and may thereafter output a corresponding indication of planogram compliance or non-compliance to a user, e.g., using the GUI 136 of FIG. 1.

Figure 3A:
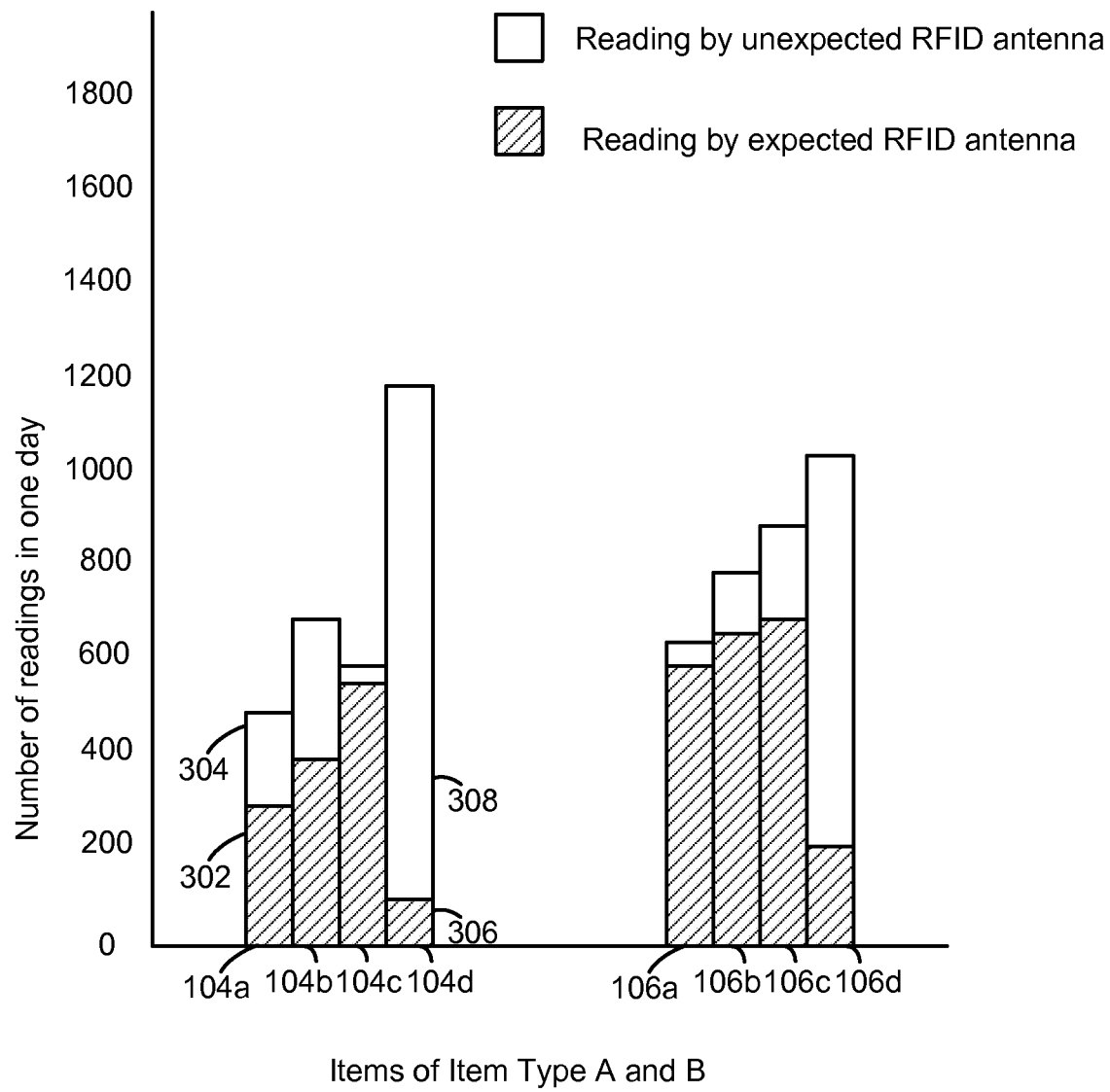
FIGS. 3A and 3B are graphs illustrating operations of the planogram compliance manager of FIG. 1.
Figure 3B:
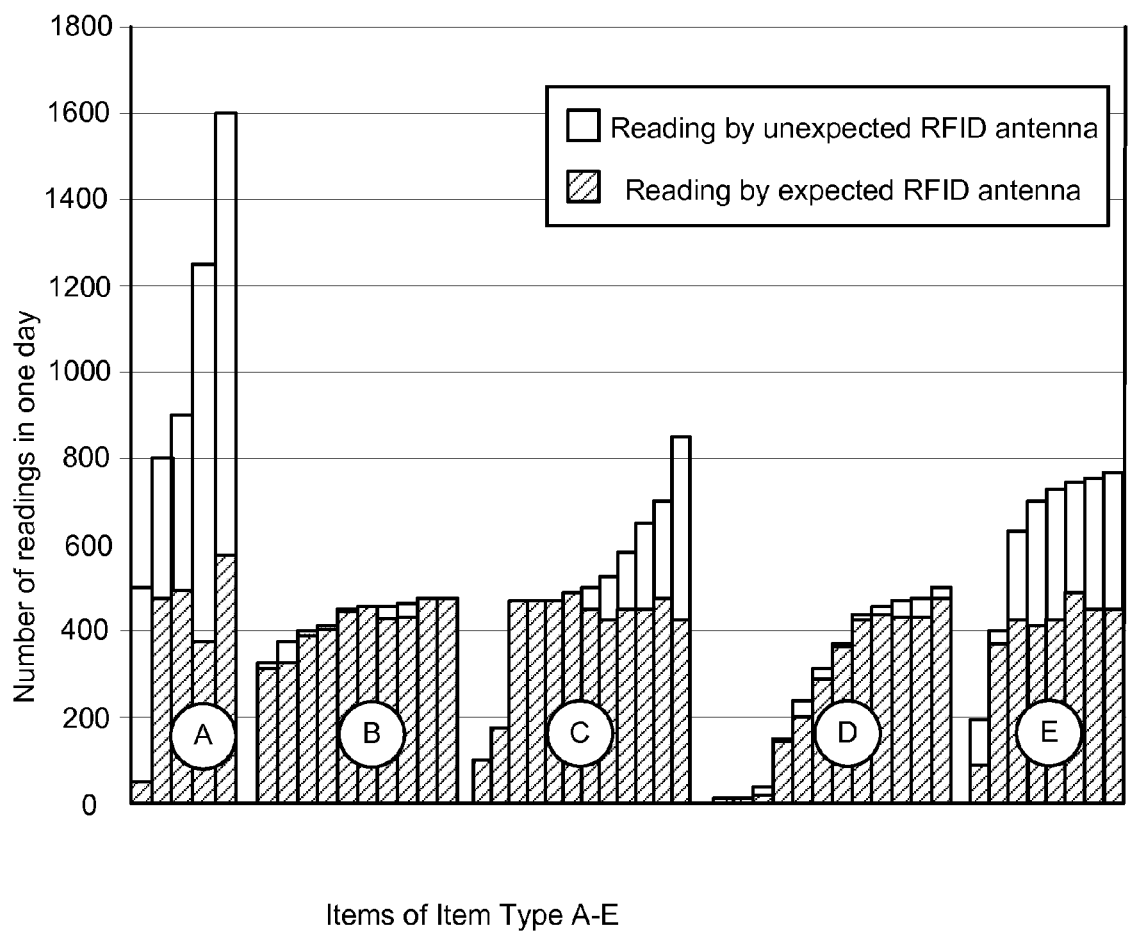

FIGS. 3A and 3B are graphs illustrating operations of the planogram compliance manager 102 of FIG. 1. In FIG. 3A, an example is illustrated in which the items 104A-104D and 106A-106D are counted and otherwise evaluated by the planogram compliance manager 102, in preparation for, or in association with, operations of the cluster analyzer 130 in determining the first and second cluster referenced above and illustrated in more detail in FIGS. 4A and 4B below.

Specifically, FIG. 3A illustrates results of a plurality of readings performed by the RFID reader 112 and associated receivers 108, 110 in the course of one day. For example, as referenced above, the receivers 108, 110 may be configured to execute readings and generate corresponding item read events for ten minute windows, once per hour over the course of the day. Of course, such a configuration is merely an example and a number, extent, or type of reading(s) may be executed in any desired manner, as would be appreciated by one of skill in the art.

In the example of FIG. 3A, as referenced above, it is assumed that items 104A-104D are associated with the first item type while items 106A-106D are associated with the second item type. Thus, FIG. 3A illustrates a counting associated with each of the items over the course of the day. As illustrated by the legend of FIG. 3A, hatched portions of the graph correspond to item read events associated with an expected RFID antenna for that item type, while un-hatched portions correspond to readings associated with the unexpected RFID receiver.

For example, with reference to the item 104A, a portion of the graph 302 is illustrated as being hatched and thus corresponding to a number or count of read events associated with the item 104A as received by the first (expected) receiver 108. Meanwhile, a portion 304 is illustrated as un-hatched and representing a stacked counting of item read events associated with the wrong or unexpected receiver (in this case, the second receiver 110). In other words, as explained above, the system 100 is configured so that the item 104A, having been placed in the first location 104, should be read by and detected by the first receiver 108 as the correct/right RFID reader. In fact, FIG. 3A illustrates that the item 104A is detected by the correct RFID receiver 108 for the majority of the times, but is also detected by the wrong/unexpected receiver 110 (specifically, as shown by the portion 304).

Similarly, but conversely, the item 104D in FIG. 1 is in fact incorrectly placed at the second location 106 according to the planogram. Thus, a portion 306 of the graph of FIG. 3A illustrates that the item 104D of the item type associated with the first location 104 is sometimes read by the right/expected receiver 108, notwithstanding the fact that the item 104D is in fact in the incorrect location (in this case, the second location 106). Further, as may be expected, the item 104D, being located at the second location, 106 is read much more frequently than is read by the expected receiver 108.

Similar observations may be made for each of the remaining items 104B and 104C of the first item type, as well as for items 106A-106D of the second item type. It may be observed that misplaced items such as the item 104D or the item 106D are detected with a higher frequency then correctly placed items, which may be expected due to the fact that misplaced items are by definition in unexpected locations and therefore are less likely to be identified by potential users (e.g., by potential customers or purchasers within the retail environment).

FIG. 3B illustrates a second graph that is conceptually similar to the example of FIG. 3A but that represents a larger number of item types A-E and is selected to illustrate a scenario in which no item is misplaced or removed from its expected location according to an associated planogram. Thus, FIG. 3B illustrates the extent of variation that may be experienced by the RFID reader 112 and associated receivers 108, 110. That is, for example, items of the item type A show a large number of readings by the wrong/unexpected RFID receiver, even though, as mentioned, all of the items are in fact correctly placed throughout the time of the readings and were not placed at the location associated with the wrong/unexpected RFID antenna at any time. Meanwhile, items of the item type B in FIG. 3B illustrate that virtually all of the item read events were in fact received from the correct/expected RFID receiver, and only a small number of item read events were associated with the wrong/unexpected RFID antenna.

It may be appreciated that such groupings of the various items into associated item types may take advantage of the fact that items of the same item type tend to have the same physical characteristics and thus tend to follow a relatively similar reading pattern, i.e., a distribution or number of readings by the correct/expected RFID receiver as compared to the number of readings by the wrong/unexpected RFID receiver. At the same time, items of different item types may show great variation relative to one another. For example, as just described, items of the item type A show great variation in this regard, while item of the item type B show very little variation.

Thus, FIG. 3B illustrates example reasons why it is difficult to correctly determine a location of an item, since, for example, various items were identified more often by the wrong receiver than by the right antenna (product A). Further, the number of times that an item is identified during a certain interval may vary considerably (e.g., product D), because RFID antennas are known to have "blind spots" in which RFID tags may be difficult or impossible to identify.

FIGS. 3A and 3B illustrate the advantage imparted by use of the low pass filter 126 of FIG. 1. In particular, it may be observed from FIGS. 3A and 3B, as just referenced, that a large variation exists in a frequency with which various items and item types are detected with respect to particular RFID receivers. By applying a low pass filter, such variation may be reduced, and a high frequency or a large value of countings may be reduced, so that less variation exists within and among items and item types.

In example implementations, the low pass filter 126 may be configured to implement a transfer function based on a square root. Advantageously, a cut off characteristic of such a transfer function based on a square root results in high frequency or large value countings as being reduced considerably, while lower frequency and smaller value countings are not reduced by as large a factor. In general, low pass filters relying on a square root transfer function are well known, and are therefore not discussed here in greater detail. Further, many other types of low pass filters exist and may be designed and used by one of skill in the art, as would be apparent.

Figure 4A:
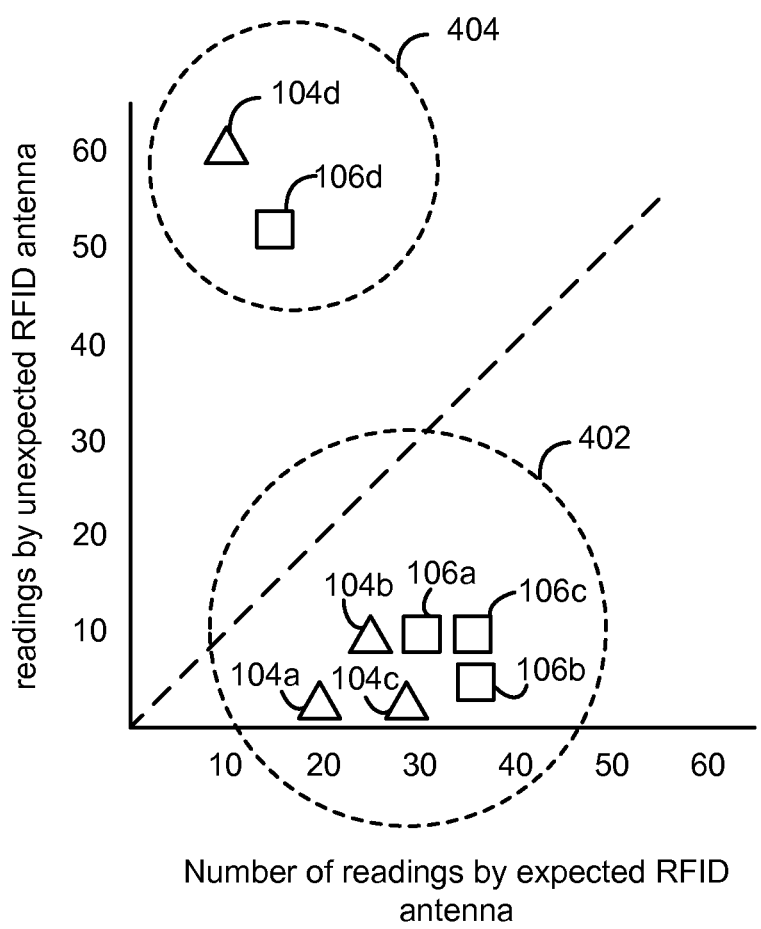
FIGS. 4A and 4B illustrate graphs showing examples of functionality and operations of the cluster analyzer of FIG. 1
Figure 4B:
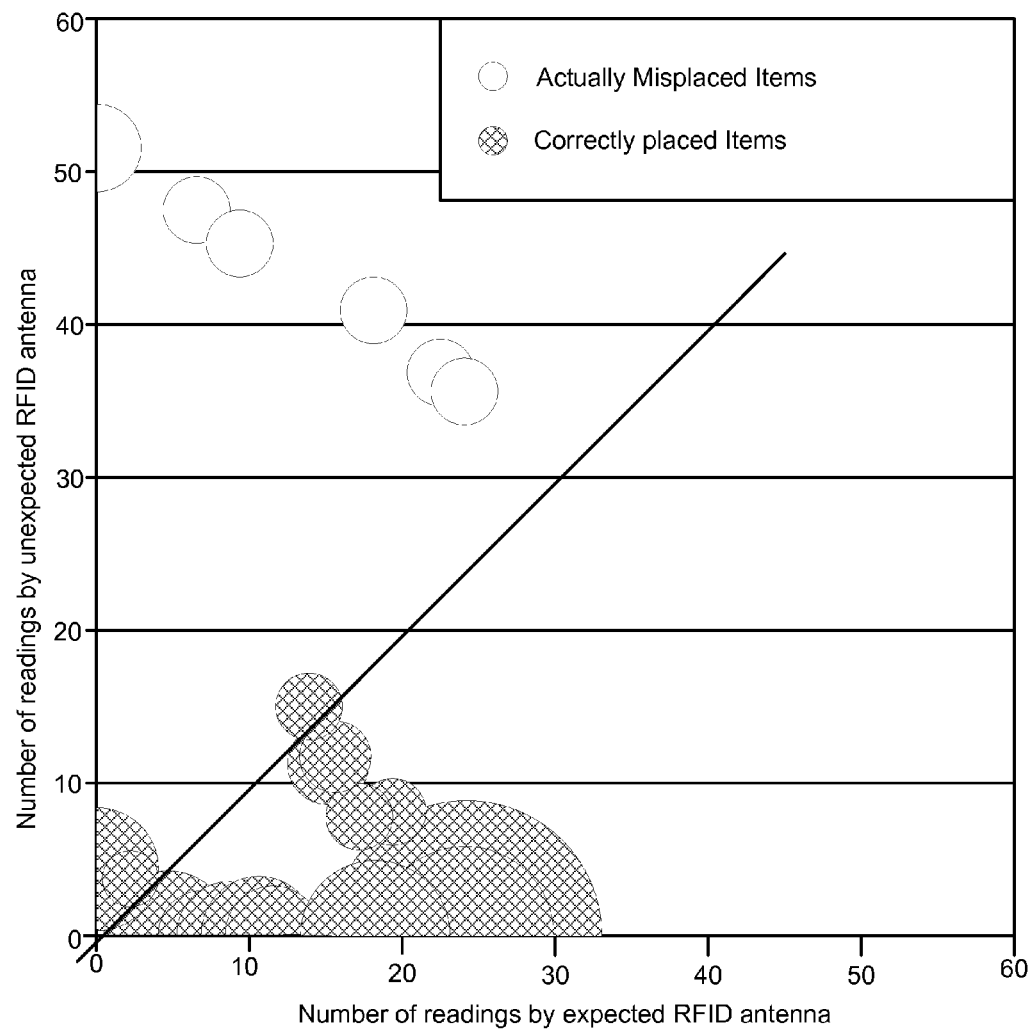

FIGS. 4A and 4B illustrate graphs showing examples of functionality and operations of the cluster analyzer 130 of FIG. 1. In the example of FIG. 4A, a graph is illustrated which corresponds conceptually to the graph of FIG. 3A and to the illustrated examples of FIG. 1. In particular, as in FIG. 1 and FIG. 3A, item read events associated with items 104A-104D are similarly labeled and illustrated using triangles, whereas item read events associated with items 106A-106D are similarly labeled and illustrated with squares.

FIG. 4A illustrates that the cluster analyzer 130 of FIG. 1 may use the first counting of item read events associated with the first receiver 108 to graph a position of a corresponding item along an X axis of the graph, while using the second counting of the item read events associated with the second receiver along a Y axis of the graph. That is, as shown, the X axis of FIG. 4A corresponds to a number or count of readings by a right/expected antenna for each item type, and thus corresponds to the hatched portion of the bar graph(s) of FIG. 3A. Meanwhile, the Y axis of the graph of FIG. 4A illustrates a number of readings by a wrong/unexpected RFID antenna for each item type, and thus corresponds to the stacked un-hatched portions of the bar graph of FIG. 3A.

To take a particular example, the item 104A as already illustrated and discussed with respect to FIG. 3A and FIG. 1 is assumed to be correctly placed at the first location 104 and is thus counted a majority of the times by the correct/expected first receiver 108, and is consequently positioned further along the X axis than along the Y axis. It may be noted that the values illustrated on the X and Y axis are smaller than the number of countings illustrated along the Y axis of FIG. 3A, which is a result of the use of the cluster analyzer 130 of filtered values from the low pass filter 126 rather than absolute values of countings illustrated with respect to FIG. 3A as received by the event handler 122. FIG. 4A represents a conceptualization of such filtered (reduced) values and does not necessarily illustrate a use of the square root low pass filter referenced above.

In another specific example, the item 104D, which is illustrated in FIG. 1 as being incorrectly placed at the second location 106, is illustrated in both FIG. 3A and FIG. 4A as being counted considerably more often by the wrong/unexpected RFID antenna 110, and is thus placed considerably further along the Y axis of FIG. 4A than along the X axis.

In other words, with respect to item 104A, the portion 302 of FIG. 3A is associated with positioning of the count of the item read events for the item 104A along the X axis of FIG. 4A, while the stacked portion 304 of FIG. 3A is associated with placement along the Y axis of FIG. 4A. Similarly, for the item 104D, the portion 306 of FIG. 3A is associated with placement of the item 104D along the X axis of FIG. 4A, while the portion 308 of 3A is associated with placement of the item 104D along the Y axis of FIG. 4A.

In FIG. 4A, a diagonal of the graph FIG. 4A, as illustrated therein, provides an approximate measure or indication of whether a particular item was read more often, on average, by the incorrect/unexpected antenna than by the correct/expected antenna. That is, items above the diagonal are generally detected by the wrong/unexpected antenna while items graphed below the diagonal are generally detected more often by the right/expected antenna.

The cluster analyzer 130 may thus analyze the graphed representations of the various items and item read events in countings thereof, by applying a clustering algorithm to the graph of FIG. 4A to obtain a first cluster 402 and a second cluster 404. Such clustering algorithms, by themselves, are known, and many variations thereof would be apparent to one skilled in the art. In general, such clustering algorithms are designed to examine an otherwise disparate grouping(s) of graph items and assign each of the items to one, two or more clusters.

For example, a clustering algorithm known as the K-means algorithm is designed to identify two clusters within a distribution of graphed items. In operation, the K-means algorithm may generally be executed by selecting a random location within the graph, such as in the graph of FIG. 4A, and then determining a distance of all graphed items to the selected random location. Then, graphed items closest to the randomly selected location may be considered to be one cluster and a center of such a cluster may then be calculated. The above-described operations may then be repeated for a second cluster, and then repeated as a whole, iteratively, until the two clusters stabilize.

In another example of a clustering algorithm, the expectation maximization (EM) clustering algorithm may be implemented. The EM algorithm is conceptually similar to the K-means algorithm, but uses probability to express potential membership of graphed items within a particular cluster. In other words, in comparison to the K-means algorithm, rather than the assigning a graphed item to a particular cluster, the EM clustering algorithm assigns a probability associated with whether a particular graphed item may be, or should be, included within a particular cluster. Thus, for example, a particular graphed item may be assigned a probability of 80% of being included within a first cluster and assigned with a probability of 20% of being included within a second cluster. Such a soft boundary may yield improved results relative to the fixed boundary of the K-means algorithm, since, e.g., such an approach may allow graphed items to be assigned to other clusters more easily, and may avoid situations where a poorly-selected initial condition leads to an unacceptable result.

More generally, the EM algorithm is known to find a maximum likelihood estimate of the parameters of an underlying distribution that fit a given data set. It is particularly useful when the underlying distribution is the normal distribution, since a closed form for the estimators exists. Thus, the EM algorithm may be computed relatively quickly. As referenced above, the EM algorithm starts with an estimate of the parameters of the distribution and improves the estimate iteratively. In each iteration, the EM algorithm first estimates expected values of the distributions (E-step), and then re-estimates the parameters of the distribution to maximize their likelihood (M-step). In the examples of FIG. 1-4, the EM algorithm may be configured to find two clusters, one cluster of misplaced items, and one cluster of items placed at their correct location according to the planogram, such as the clusters 402, 404 of FIG. 4A.

In this regard, it will be appreciated from the present description that there may be cases in which all or none of the items are misplaced, and thus both clusters may represent misplaced items, or both clusters may represent items placed at the correct location according to the planogram. As described below, average values of the item read events associated with the correct and/or incorrect receiver 108, 110 within each cluster may be used to decide whether one or both clusters represent misplaced items. For example, in FIG. 4A, items 104d, 106d are read, on average, more often by the unexpected receiver/antenna, while items 104a-104c and 106a-106d are read on average more often by the expected receiver/antenna. Thus, the results manager 132 may determine that the first cluster 402 is associated with items in planogram compliance, while the second cluster 404 contains items in non-compliance with the planogram.

FIG. 4B illustrates a second example of the graph of FIG. 4A. FIG. 4B specifically considers items within a retail environment, where it may occur that items are moved, removed, or added. For example, items may be sold to customers or otherwise removed their corresponding location. In other examples, such sold or otherwise removed items may be replenished by personnel of the retail store.

FIG. 4B illustrates an example in which replenishment of sold items occurs and in which 25% of the items are known to be misplaced according to a corresponding planogram. In FIG. 4B, the hatched circles represent items placed at the correct/expected location, while un-shaded circles represent misplaced items, according to the planogram and to the legend of FIG. 4B.

In FIG. 4B, a size of each circle represents a number of items with the same X and Y coordinates within the graph of FIG. 4B. In other words, if a graphing of a count of item read events for a first item and a second item of an item type results in overlapping placement of corresponding graphical representations, then such a situation may be represented by increasing size of the graphed item representation.

As referenced above, EM algorithm may be used to fit two normal distributions on the data of each determined cluster in FIG. 4B. As illustrated, items placed at the correct/expected location shows a small number of RFID readings, on average around 12 readings, because of constantly changing items resulting from sales in a replenishment period. Meanwhile, the misplaced items are read more often, since they are not sold. On average, the misplaced items are read approximately 44 times at their current location. Application of the low pass filter 126 of FIG. 1 may be used to reduce this large difference in the number of readings of correctly placed versus misplaced items.

In applying the EM algorithm, one cluster of misplaced items is expected, based on FIG. 4B in which the items average around 44 readings from the incorrect location, and around approximately 8 readings from the correct location. Further, the cluster of correctly placed items shows on average less than one reading from the incorrect location, and approximately 12 readings from the correct location.

FIGS. 4A and 4B do not specifically illustrate designations of the two clusters corresponding to 402 and 404 of FIG. 4A, but the existence of such clusters may easily be observed in FIG. 4B. In this regard, it may be appreciated that FIGS. 4A and 4B illustrate simplified examples in which the data is clearly segregated into 2 separate clusters, and the EM algorithm may easily identify the clusters exactly as expected, i.e., provides no false negatives and no false positives in identifying the various items in item locations. In more complicated or less segregated examples, the EM algorithm or other clustering algorithms may nonetheless provide higher levels of accuracy in identifying the misplaced items than most or all existing approaches to planogram compliance using item tracking technology such as RFID. Further, as described herein, the described approach may be applied very quickly and consistently, and may provide an accurate level of planogram compliance on a small or large scale.

Figure 5:
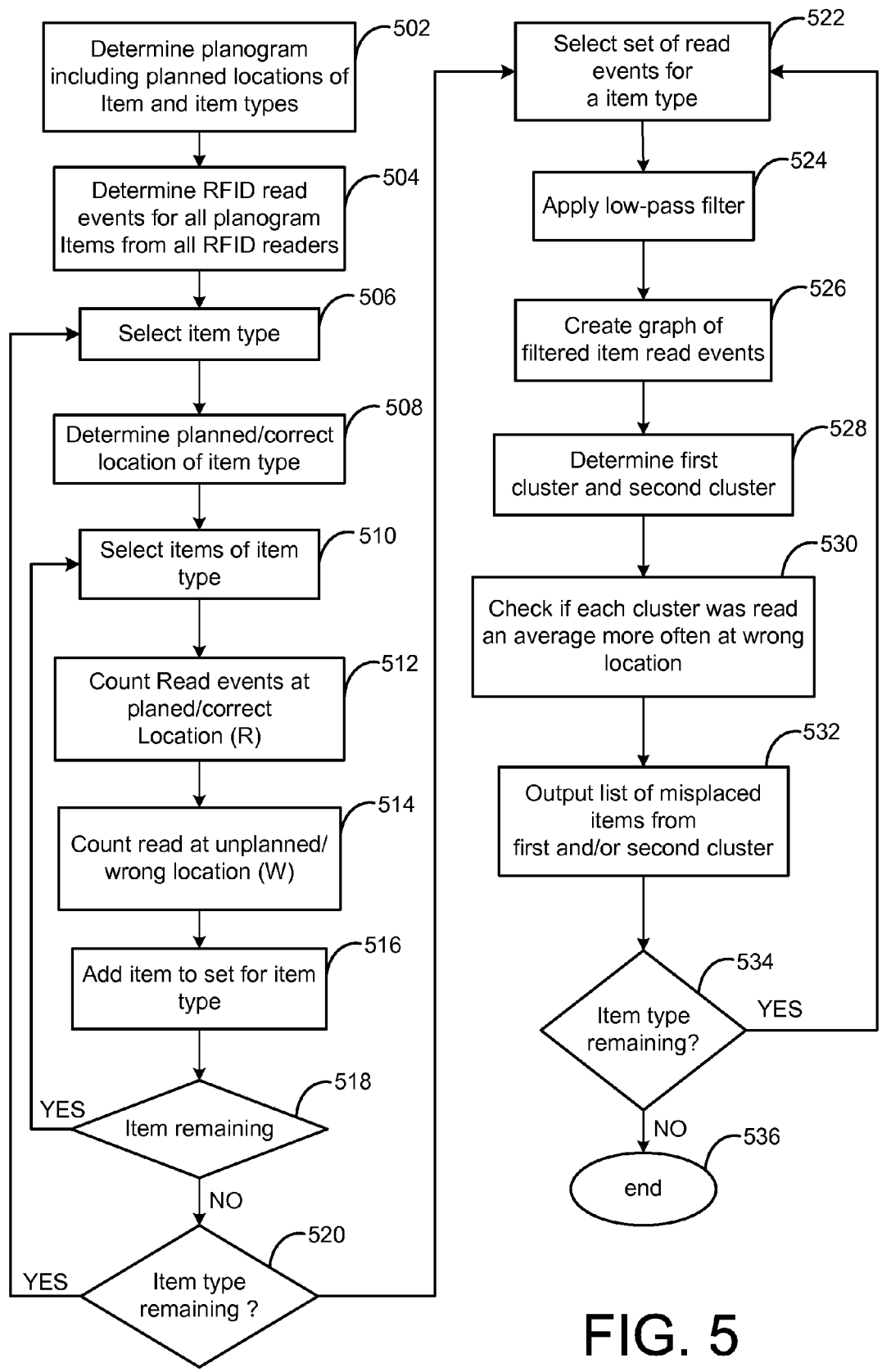
FIG. 5 is a flowchart illustrating additional example operations of the system of FIG. 1.

FIG. 5 is a flowchart 500 illustrating more detailed examples of the operation of the System 100 of FIG. 1. In the example of FIG. 5, a planogram may be determined (502), including plan locations of items of designated item types. For example, as described, the planogram reader 128 of FIG. 1 may be configured to determine a corresponding planogram which designates a location of items 104A-104D of the first item type at the first location 104, and may be used to determine a location of the items 106A-106D of the second item type at the second location 106. Item read events for all items associated with the determined planogram may be determined and received from all relevant RFID receivers (504). For example, the event handler 122 may receive all item read events from the RFID reader 112, regardless of whether the item read events are associated with a given item type, and/or originate from the first receiver 108 or the second receiver 110. Thus, as described, the overall set of item read events originating from both the first receiver 108 and the second receiver 110 may include readings of all items at the corresponding locations of the first receiver 108 and the second receiver 110, as well as incorrect readings of each receiver 108, 110 of items which are actually located at the location associated with the other receiver.

A first item type may then be selected (506), e.g., by the cluster analyzer 130 and/or by the result manager 132, so that the system 100 including the planogram compliance manager 102 may iterate through all relevant item types of the planogram. For example, the item type of the items 104A-104D associated with the first location 104 may first be selected. Then, a planned, correct, or expected location associated with the selected item may be determined (508). For example, the cluster analyzer 130 and/or the result manager 132 may consider the planogram as obtained by the planogram reader 128 to determine that the expected location of items 104A-104D of the item type associated with the first location 104 may be associated therewith and may therefore be expected to be read by the first receiver 108.

An item of the selected item type may then be selected (510). Item read events associated with the unexpected/planned/correct location may then be counted (512), and item read events associated with the unexpected/unplanned/wrong or incorrect location may also be counted (514). For example, as already described, for selection of the item 104A (510), item read events 302 of FIG. 3A may be counted (512) as associating the item 104A with the planned or correct location 104 and associated RFID reader 108. Meanwhile, item read events 304 of FIG. 3A may be counted (514) as being associated with a reading of the second RFID receiver 110 at the incorrect or unexpected second location 106. In other words, the item 104A may be detected correctly multiple times by the expected first RFID receiver 108 and may be detected some presumably smaller number of times by the unexpected second RFID receiver 110, notwithstanding the fact that the item 104A is in fact correctly placed at the first location 104.

The item thus selected and counted may then be added to a defined set for the associated item type (516). For example, the cluster analyzer 130 may assign the thus-counted associated item read events within a group as shown in FIG. 3A associated with item of the first item type A. If any items are remaining to be counted (518), then the next item may be selected accordingly (510). For example, the cluster analyzer 130 may select the item 104D as being the next item to be counted. Then, the iterative process may continue (512-516) by counting the item read events 306 as shown in FIGS. 3A and 308 as shown in FIG. 3A before adding the item 104D to the corresponding item type set.

When no more items of the particular item type are remaining (518), then the cluster analyzer 130 may determine whether any remaining item types as a whole are remaining that are associated with the planogram and not yet categorized for planogram compliance (520). For example, the cluster analyzer 130 may consult the planogram from the planogram reader 128 and may determine that items 106A-106D of the item type associated with the second location 106 may have not yet been analyzed for planogram compliance, and may thus repeat the above iterations and operations (506-518) before proceeding. That is, once no more item types are remaining (520), then the cluster analyzer 130 may proceed with selecting one of the thus-constructed item type sets (522) for a selected item type. Then, in the example of FIG. 5, the low pass filter 126 may be applied (524), so as to e.g., reduce variations and readings between items of the item type, as already described above.

A graph of the filtered item read events may then be constructed (526). For example, the cluster analyzer 130 may create a graph such as the graph in FIG. 4A or FIG. 4B in which item read events associated with a correct or expected RFID receiver placed along the X axis and item read events associated with the incorrect or unexpected RFID receiver are placed along the Y axis.

Then, the cluster analyzer 130 may apply a clustering algorithm such as K-means algorithm or the EM algorithm to determine a first cluster and a second cluster (528). As referenced above, it may be considered that the various items being analyzed for planogram compliance may all be correctly placed, or may all be misplaced according to planogram. Thus, the result manager 132 may consult the planogram from the planogram reader 128 and/or otherwise determine whether each cluster was read on average more often at the wrong or unexpected location as compared to being read on average more often at the right or expected location (530).

If a cluster was read on average more often at the wrong location, then the item read events contained therein and associated items may be determined to be misplaced so that a list of misplaced items may be output (532) identifying the first cluster and/or the second cluster as being associated with such misplaced items according to the planogram. For example, as referenced above, the result manager 132 may output such a list of misplaced items using the GUI 136, e.g., by providing a map illustrating the locations 104, 106 and/or graphically illustrating which of the locations is experiencing planogram non-compliance, and whatever other additional level detail may be desired to be provided regarding the planogram non-compliance.

If there are any item types remaining (534), then operations of the flowchart 500 of FIG. 5 may continue (522-532), until no such item types are remaining (534), at which point the process ends (536). For example, operations 512-532 may proceed with respect to items 104A-104D of the item type associated with the first location 104, and then iteratively repeat such operations with respect to items 106A-106D of the item type associated with the second location 106.

Algorithm 1 below illustrates an example implementation of an algorithm for determining an actual position of items associated with RFID tags which are identified by more than one RFID receiver/reader in the manner described above. As referenced above, the Algorithm 1 is motivated by the fact that items of the same item type may show similar reading patterns. In the example of Algorithm 1, it is considered that the item type corresponds to a product type, e.g., a brand or classification of an item for sale within a retail environment such as a grocery store. In this case, as described above, a number of item read events for each location and for each item may initially be counted. Since such item read events may produced unpredictable and varied item sets, the number of readings may show great variation, and may thus benefit from application of the low pass filter 126 to concentrate on the values to a small interval period. Then, the clustering algorithm such as the K-means algorithm or the EM algorithm may be applied to all items of a certain item type, whereupon it may be determined which such clusters, if any, represent misplaced items according to a corresponding planogram.

Algorithm 1

1. input lists ItemEvents, Products
2. MisplacedItems = { }
3. for all ( product p ∈ Products ) do
4.  P = { }
5.  loc = getLocation(p, Products)
6.  for all ( item i ∈ ItemEvents ) do
7.   eventR = countEventsFrom(loc)
8.   eventW = countEventsFrom( −loc)
9.   P = P ∪ {(i, eventR, eventW)}
10.  end for
11.  P = lowpassFilter(P)
12.  CreateClusters($P_i$)
13.  for all ( cluster $P_i$ ) do
14.   if ( $P_i$.mean(eventW) > $P_i$.mean(eventR) ) then
15.    MisplacedItems = MisplacedItems ∪ $P_i$
16.   end if
17.  end for
18. end for
19. output MisplacedItems Algorithm 1 uses two data structures. Specifically, a first data structure "ItemEvents" represents a list with all item read events stating which items were identified by which RFID receiver. A second input data structure is represented as "Products," representing a list of products/product types and their planned location according to the planogram.

Algorithm 1 thus begins iteration through all existing product/product types at line 3. That is, first the planned location of each product type is determined using the data structure/list of products at line 5. For each item, a number of item read events at the planned/expected location (EventR), is counted and the number of readings at the wrong/unexpected location (EventW) is counted. Whereupon, the item may be added to a set p of items belonging to the product type P (lines 6-9).

Afterwards in Algorithm 1, a low pass filter is applied to concentrate the value of EventR, EventW of each item to a smaller interval at line 11. The clustering algorithm is applied to create i clusters, $P_i$ (line 12). Then it is determined in Algorithm 1 that the cluster represents misplaced items by checking if on average the cluster is read more often at the wrong/unexpected location, i.e., at lines 13-17 of the algorithm. After iteration through all product types, the set of misplaced items is returned by Algorithm 1.

As described herein, the system 100 of FIG. 1 and associated or alternative implementations and operations thereof provide an ability to overcome physical and other constraints of item tracking technology such as RFID. Consequently, the system 100 and related or alternative implementations thereof provide for better integration of RFID data within backend systems to provide real time analytics for immediate process control, including planogram compliance as described herein, as well as associated processes such as data mining of customer data to increase profitability, and other applications.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium and executable by at least one processor, the system comprising:
    a planogram reader configured to determine a planogram specifying items of an item type being associated with a first location;
    an event handler configured to receive, over at least one pre-defined period of time, item read events for the items of the item type from a first receiver associated with the first location and from a second receiver associated with a second location that is different than the first location;
    a cluster analyzer configured to:
        apply a clustering algorithm to a first counting of the item read events associated with the first receiver within the at least one pre-defined period of time and a second counting of the item read events associated with the second receiver within the at least one pre-defined period of time to thereby determine a first cluster corresponding to a first subset of the items and a second cluster corresponding to a second subset of the items,
        determine, for item read events and associated items within the at least one pre-defined period of time, a first number of times each item was read by the first receiver within the first counting and a second number of times each item was read by the second receiver within the second counting, and
provide a graph of the first number of times relative to the second number of times for each item;
a result manager configured to determine, for each cluster, whether the item read events contained therein indicate a presence of the corresponding subset of the items at the second location and in non-compliance with the planogram; and
a compliance analyzer configured to track the cluster analyzer and the result manager over the at least one pre-defined period of time to analyze levels of planogram non-compliance.

2. The system of claim 1 wherein the planogram reader is configured to determine the planogram as specifying a plurality of item types, including the item type, and specifying corresponding positions of each of the plurality of item types and items thereof with respect to a plurality of locations including at least the first location and the second location.

3. The system of claim 1 wherein the event handler is configured to receive the item read events from the first receiver and the second receiver including, respectively, a first Radio Frequency Identification (RFID) antenna and a second RFID antenna.

4. The system of claim 1 wherein the first location and the second location represent a first shelf and a second shelf, respectively.

5. The system of claim 1 wherein the item read events include an item read event for a first item of the items of the item type that is received from the second receiver while the first item is positioned within the first location, and further wherein the item read events include an item read event for a second item of the items of the item type that is received from the first receiver while the second item is positioned within the second location.

6. The system of claim 1 wherein the event handler is configured to receive the item read events during the at least one pre-defined period of time during which the first receiver and second receiver are activated to obtain multiple readings of at least some of the items of the item type.

7. The system of claim 1 comprising a low pass filter configured to receive the item read events from the event handler, apply a low pass filter to the item read events to obtain filtered item read events, and forward the filtered item read events to the cluster analyzer for use thereof in determining the first counting and the second counting.

8. The system of claim 1 wherein the result manager is configured to determine, for each cluster, whether the item read events contained therein indicate a presence of the corresponding subset of the items at the first location and in compliance with the planogram.

9. The system of claim 1 wherein the result manager is configured to determine whether on average items of the second cluster were read more often by the second receiver as not expected by the planogram than by the first receiver as expected by the planogram, and to determine the non-compliance based thereon.

10. The system of claim 1, wherein the result manager is configured to output an alert of planogram non-compliance based on a determination of the presence of the corresponding subset of the items at the second location.

11. The system of claim 1, comprising a compliance manager configured to receive later-obtained item read events from the event handler and to compare the later-obtained item read events with the determination of non-compliance of the corresponding subset of the items of each cluster, in order to track planogram compliance over time.

12. A computer-implemented method comprising:
determining a planogram specifying items of a item type associated with a first location;
receiving, over at least one pre-defined period of time, item read events for the items of the item type from a first receiver associated with the first location and a second receiver associated with a second location that is different than the first location;
determining a first counting of the item read events associated with the first receiver within the at least one pre-defined period of time;
determining a second counting of the item read events associated with the second receiver within the at least one pre-defined period of time;
applying a clustering algorithm to the first counting and the second counting to determine a first cluster corresponding to a first subset of the items and a second cluster corresponding to a second subset of the items;
determining, for item read events and associated items within a corresponding one of the at least one pre-defined period of time, a first number of times each item was read by the first receiver within the first counting and a second number of times each item was read by the second receiver within the second counting;
providing a graph of the first number of times relative to the second number of times for each item;
determining, for each cluster, whether the item read events contained therein indicate a presence of the corresponding subset of the items at the second location and in non-compliance with the planogram; and
tracking the items and the item read events for each cluster over the at least one pre-defined period of time to analyze levels of planogram non-compliance.

13. The method of claim 12 wherein receiving the item read events from the first receiver and from the second receiver includes receiving the item read events from, respectively, a first Radio Frequency Identification (RFID) antenna and a second RFID antenna.

14. The method of claim 12 wherein receiving the item read events comprises receiving the item read events during the at least one pre-defined period of time during which the first receiver and second receiver are activated to obtain multiple readings of at least some of the items of the item type.

15. The method of claim 12 wherein determining the first counting and the second counting comprises:
applying a low pass filter to the item read events to obtain filtered item read events for use thereof in determining the first counting and the second counting.

16. A computer program product, the computer program product being tangibly embodied on a non-transitory computer-readable medium and including executable code that, when executed, is configured to cause a data processing apparatus to:
determine a planogram specifying items of a item type associated with a first location;
receive, during at least one pre-defined period of time, item read events for the items of the item type from a first receiver associated with the first location and a second receiver associated with a second location that is different than the first location;
determine a first counting of the item read events associated with the first receiver within the at least one pre-defined period of time;
determine a second counting of the item read events associated with the second receiver within the at least one pre-defined period of time;

apply a clustering algorithm to the first counting and the second counting to determine a first cluster corresponding to a first subset of the items and a second cluster corresponding to a second subset of the items;

determine, for item read events and associated items within a corresponding one of the at least one pre-defined period of time, a first number of times each item was read by the first receiver within the first counting and a second number of times each item was read by the second receiver within the second counting;

provide a graph of the first number of times relative to the second number of times for each item;

determine, for each cluster, whether the item read events contained therein indicate a presence of the corresponding subset of the items at the second location and in non-compliance with the planogram; and track the items and the item read events for each cluster over the at least one pre-defined period of time to analyze levels of planogram non-compliance.

17. The computer program product of claim 16 wherein the first receiver and the second receiver include, respectively, a first Radio Frequency Identification (RFID) antenna and a second RFID antenna.

18. The computer program product of claim 16 wherein the executable code, when executed, is configured to cause the data processing apparatus to apply a low pass filter to the item read events to obtain filtered item read events for use in determining the first counting and the second counting.

19. The system of claim 1 comprising a compliance analyzer configured to:

compare a current level of planogram non-compliance for at least one of the first location and the second location relative to one or more past levels of planogram non-compliance within the at least one pre-defined period of time, and provide visual indication of tracking information and comparing information related to planogram non-compliance.

20. The method of claim 12 further comprising:

comparing a current level of planogram non-compliance for at least one of the first location and the second location relative to one or more past levels of planogram non-compliance within the at least one pre-defined period of time; and providing visual indication of tracking information and comparing information related to planogram non-compliance.

21. The computer program product of claim 16 wherein the executable code, when executed, is configured to cause the data processing apparatus to:

compare a current level of planogram non-compliance for at least one of the first location and the second location relative to one or more past levels of planogram non-compliance within the at least one pre-defined period of time; and provide visual indication of tracking information and comparing information related to planogram non-compliance.

* * * * *